United States Patent
Thoma et al.

(10) Patent No.: US 11,378,106 B2
(45) Date of Patent: Jul. 5, 2022

(54) POSITION SENSOR FOR WORKING CYLINDER

(71) Applicant: SIKO GmbH, Buchenbach (DE)

(72) Inventors: Hanspeter Thoma, March (DE); Joachim Reichle, Freiburg (DE); Matthias Roth, Buchenbach (DE)

(73) Assignee: SIKO GmbH, Buchenbach (DE)

( * ) Notice: Subject to any disclaimer, the term of this patent is extended or adjusted under 35 U.S.C. 154(b) by 0 days.

(21) Appl. No.: 16/911,895

(22) Filed: Jun. 25, 2020

(65) Prior Publication Data

US 2020/0408228 A1 Dec. 31, 2020

(30) Foreign Application Priority Data

Jun. 27, 2019 (DE) ...................... 20 2019 103 553.6

(51) Int. Cl.
*F15B 15/28* (2006.01)

(52) U.S. Cl.
CPC .................. *F15B 15/283* (2013.01)

(58) Field of Classification Search
CPC ........................ F15B 15/283; F15B 15/2892
See application file for complete search history.

(56) References Cited

U.S. PATENT DOCUMENTS

| | | | | |
|---|---|---|---|---|
| 3,160,836 A | * | 12/1964 | Farley | F15B 15/283 336/30 |
| 4,121,504 A | * | 10/1978 | Nowak | F15B 15/283 91/363 R |
| 2015/0184990 A1 | * | 7/2015 | Glasson | F15B 15/2892 73/431 |
| 2018/0094407 A1 | | 4/2018 | Hayes et al. | |

FOREIGN PATENT DOCUMENTS

| | | |
|---|---|---|
| CN | 202092604 U | 12/2011 |
| DE | 4306539 C2 | 10/1995 |
| DE | 4438166 A1 | 5/1996 |
| DE | 202005012815 U1 | 12/2005 |
| DE | 102019200206 A1 | 7/2020 |
| FR | 2794196 A1 | 12/2000 |
| WO | 2014003992 A1 | 1/2014 |

OTHER PUBLICATIONS

International search report for patent application No. 20181667.5-1010 dated Nov. 9, 2020.

* cited by examiner

*Primary Examiner* — F Daniel Lopez
(74) *Attorney, Agent, or Firm* — Bachman & LaPointe, P.C.

(57) ABSTRACT

A position sensor (1.1, 1.2) for a working cylinder (2.1, 2.2) with a cable drum (4.1, 4.2), a cable (5) with a piston anchor (7.1, 7.2) and an interface (13.1, 13.2) for determining a position and a movement of a piston (3.1, 3.2) of the working cylinder (2.1, 2.2), the position sensor (1.1, 1.2) is to be operatively connected to the working cylinder (2.1, 2.2) from outside in the area of a cylinder head (15.1, 15.2).

15 Claims, 2 Drawing Sheets

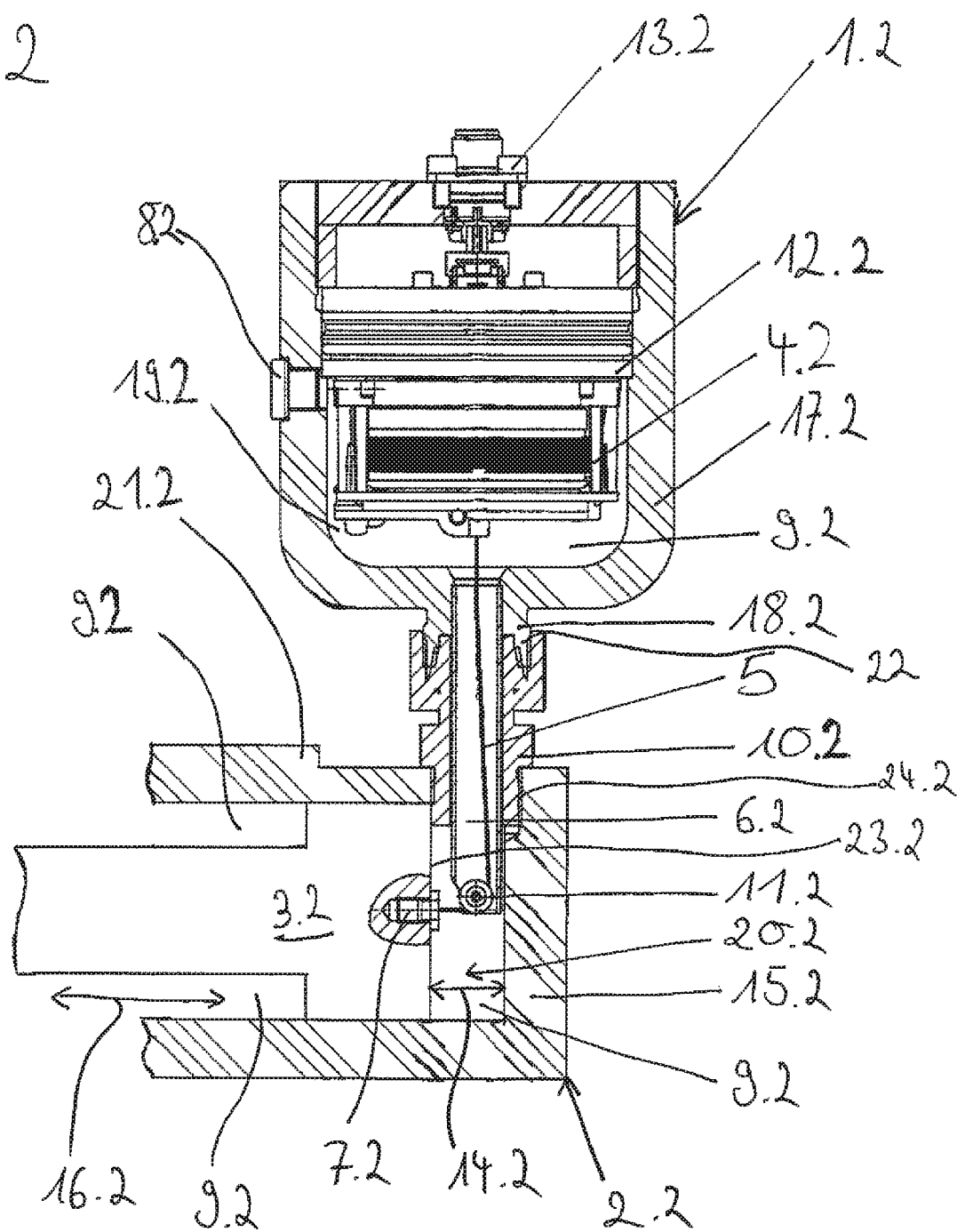

POSITION SENSOR FOR WORKING CYLINDER

TECHNICAL FIELD

The present invention relates to a position sensor for working cylinders.

BACKGROUND OF THE INVENTION

Position sensors for working cylinders are already known and used in many different forms and designs. For example, common position sensors for working cylinders are known in which a position sensor is integrated in the area of a cylinder head in the working cylinder in the piston stroke direction. Such a design is still associated with a large stroke loss and is space-consuming. In addition, the working cylinder is significantly extended by this design. For example, the DE 20 2006 012 815 U1 should be mentioned here, which reveals a path length sensor which is particularly suitable for use in the inside of a working cylinder. Furthermore, the DE 43 06 539 C2 is to be mentioned, in which an arrangement for detecting the position of a piston in a working cylinder is detected.

SUMMARY OF THE INVENTION

The object of the present invention is to overcome the disadvantages of the prior art. In particular, a position sensor for working cylinders, such as hydraulic cylinders, pneumatic cylinders or similar cylinder systems, is to be provided, which measures the direct cylinder stroke absolutely in a working cylinder or other cylinder systems. Furthermore, the stroke loss which has existed up to now in other systems is to be significantly minimized, space is to be saved and it should also be possible to apply the present invention to extremely small or working cylinders of small bore. In addition, the stability and load capacity of the cylinder and its components should not be reduced. Furthermore, a flexible installation for different sizes and designs of working cylinders should be possible, whereby the least possible work should be carried out on the working cylinders or other cylinder systems.

The features disclosed herein lead to the solution of the problem; advantageous embodiments are also described herein and in the subclaims.

The present invention relates to a position sensor for working cylinders, telescopic cylinders, piston accumulators, hydraulic and pneumatic cylinder systems and other comparable systems or cylinder systems used in industry, mobile machines or smart hydraulic systems. The position sensors are used in a variety of mobile machines, such as construction machinery, agricultural machinery, municipal vehicles or commercial vehicles.

In the following, the position sensor according to the invention is described in connection with a working cylinder. However, it should be clarified that different cylinder systems, for example hydraulic systems, pneumatic systems or other cylinder systems are also suitable for use with the position sensor according to the invention.

The position sensor according to the invention is shaped like a bottle or cartridge, making it particularly suitable for the pressures prevailing in corresponding working cylinders.

The position sensor according to the invention can be used for example, for hydraulic, pneumatic systems or other cylinder systems.

The inventive position sensor has a cable drum with a cable, a seal and an interface. The cable includes a piston anchor. The position sensor according to the invention serves to determine a position and a movement of a piston in a working cylinder. The travel path of the piston in the working cylinder is measured absolutely.

When correctly installed, the position sensor is operatively connected to the working cylinder in an orthogonal orientation to a piston stroke direction from outside in the area of a cylinder head. This has several major advantages. It is no longer necessary to carry out cost-intensive machining of the piston and the working cylinder, thus reducing integration costs. Furthermore, a weakening of the piston and the piston rod is effectively avoided.

Due to the lateral installation, i.e. the installation in orthogonal alignment to the piston stroke direction or the travel path of the piston, it is possible to use the position sensor according to the invention even in almost unsolvable applications or to retrofit it. For this purpose, only a bore suitable for a flange, a screw connection or a connection unit is required in the intended working cylinder through its outer wall in the area of a cylinder head, which can be made without further ado. This is particularly advantageous in applications where only a very small stroke loss can be accepted.

Furthermore, even extremely small piston diameters or extremely small working cylinder gages or working cylinder diameters can be equipped with this position sensor, as it is not dependent on its size due to its external and lateral arrangement.

The position sensor and the working cylinder are operatively connected to each other by a flange, a screw connection or a connection unit which passes through the working cylinder wall when used according to regulations. For installation, only a single lateral bore through the working cylinder wall of the working cylinder in the area of the cylinder head is required.

The position sensor according to the invention has a variable sensor arm which, in connection with the flange, the screw connection or the connection unit, engages through the working cylinder wall into the working cylinder and a pressure chamber. Variable means that the length and design of the sensor arm is variable and can be configured and set up according to the situation, so that an adaptation to the respective working cylinder and the cylinder gage or the piston diameter at hand can be achieved with little effort.

The position sensor according to the invention can of course also be arranged on the working cylinder at an angle deviating from the orthogonal orientation to the piston stroke direction or the travel path of the piston, i.e. more or less than 90 degrees to the outer wall of the working cylinder. An alignment is also conceivable in which the position sensor according to the invention is arranged on the outer wall of the working cylinder parallel to the piston stroke direction or the travel path of the piston. The flange and the sensor arm are adapted accordingly. This enables the individual adaptation and installation of the position sensor in accordance with the invention in almost all conceivable installation situations, whereby a simple and space-saving installation or a corresponding retrofitting can be carried out in almost any installation situation.

This enables maximum flexibility, whereby the position sensor can be universally adapted to or installed on all cylinder sizes. It is essential that the sensor arm redirects the cable with the piston anchor in such a way that it is aligned in the stroke direction of the piston and at the same time to the center of the piston.

The sensor arm comprises, at the end facing away from the cable drum, which, when correctly installed inside the working cylinder, namely in the pressure chamber, a deflection roller which allows the cable of the cable drum to be deflected in the direction of a piston stroke direction towards the center of the piston of the working cylinder. The deflection roller is a wheel or a roller equipped with a guide for the cable. The deflection roller is mounted in the sensor arm so as to rotate both counterclockwise and clockwise. The bearing allows a particularly good and wear-minimizing run of the cable.

The cable drum is arranged in a pressure room whereat the pressure room is connected to a pressure chamber of the working cylinder via a bottleneck area, the sensor arm and the flange. The pressure room of the position sensor and the pressure chamber of the working cylinder are, for example, filled with fluids or another suitable medium. The pressure room and the pressure chamber are connected to each other via the flange and the sensor arm, which is why the pressure in the pressure room and the pressure chamber is the same. This has the advantage that no pressure gradient has to be overcome when recording the measurement data.

In the pressure room of the position sensor, the cable drum is located on the side of the seal that is directed towards the bottleneck area. The cable drum contains the unwindable and rewindable cable. The cable has a piston anchor at its end facing away from the cable drum. The cable drum is operatively connected to the piston of the working cylinder via the cable with the piston anchor, the cable being deflected in the piston stroke direction via the sensor arm and its deflection roller. The piston anchor engages in the center of the upper side of the piston in a positive or non-positive manner. It is also provided that the piston anchor can be screwed into the piston at a central position, which is why the piston anchor in this case is equipped with a thread which can be screwed into a corresponding threaded hole in the piston. The upper side of the piston means the side of the piston that is directed towards the cylinder head. By center is meant the center of this side, whereby, in the case of a circular piston, having the same distance from the center in every outward direction to the inside of the working cylinder wall.

The cable, which is connected to the piston via the piston anchor, is unwound and rewound from the cable drum by the movement of the piston and diverted by the sensor arm, which enables the recording of the measurement data. By installing different cable drums, measuring ranges from preferably 0 to 5000 millimetres but also measuring ranges beyond this are possible. The measuring range is determined by the length of the stroke of the piston in the working cylinder. It is therefore possible to install different cable drums with different cable holders in the position sensor, so that an adaptation to the existing working cylinder and its individual stroke length can be made. In addition to the variable sensor arm, this further increases flexibility and adaptability to a wide variety of working cylinders.

It is advisable for the cable drum to be connected to the piston of the working cylinder via the cable with the piston anchor, so that measurement data on the respective position and movement of the piston can be recorded. This measurement data on the respective position and movement of the piston, as well as other measurement data relating to the working cylinder and its piston, are recorded by the cable drum and transmitted to the interface, which then forwards the measurement data to a computer or a control unit.

The cable drum and the interface are separated from each other by the seal. The transmission of measurement data from the cable drum to the interface is therefore wireless, in particular by magnetic data transmission. Of course, other suitable transmission paths and methods for transferring the measurement data from the cable drum to the interface are also possible and provided for, for example by means of load modulation.

The seal preferably consists of a non-magnetic flange and a radial high-pressure seal. This is particularly advantageous for magnetic data transmission from the cable drum to the interface, as it makes transmission much easier.

The position sensor also includes a venting device. This venting device represents a pressure-tight sealable opening through the outer wall to the pressure room of the position sensor. This has the advantage that air in the system, i.e. in the pressure room or in the pressure chamber, can be vented and fluids or another suitable medium can be refilled if necessary. Of course, it is also possible to provide this venting device at another position on the position sensor; it may even be possible to do without this venting device in some embodiments.

It is also planned that a number of additional cable drums with additional cabels, which differ in their construction and can accommodate cables of different lengths and strengths, can be installed in the position sensor as required. By exchanging different cable drums with different cables as required, flexible adaptation to the respective working cylinder is possible. Furthermore, it is possible to use cables that are adapted to the length and design as well as the respective requirements of the working cylinder.

It is provided to cover a piston stroke measuring range of preferably 0 to 5000 millimetres, which can also extend beyond this.

BRIEF DESCRIPTION OF THE DRAWINGS

Further advantages, features and details of the invention can be found in the following description of preferred embodiments and in the drawing, which shows in FIG. 1 a sectional view of a position sensor with working cylinder according to the invention;

FIG. 2 a sectional view of another position sensor with working cylinder according to the invention.

DETAILED DESCRIPTION

Figure 1:
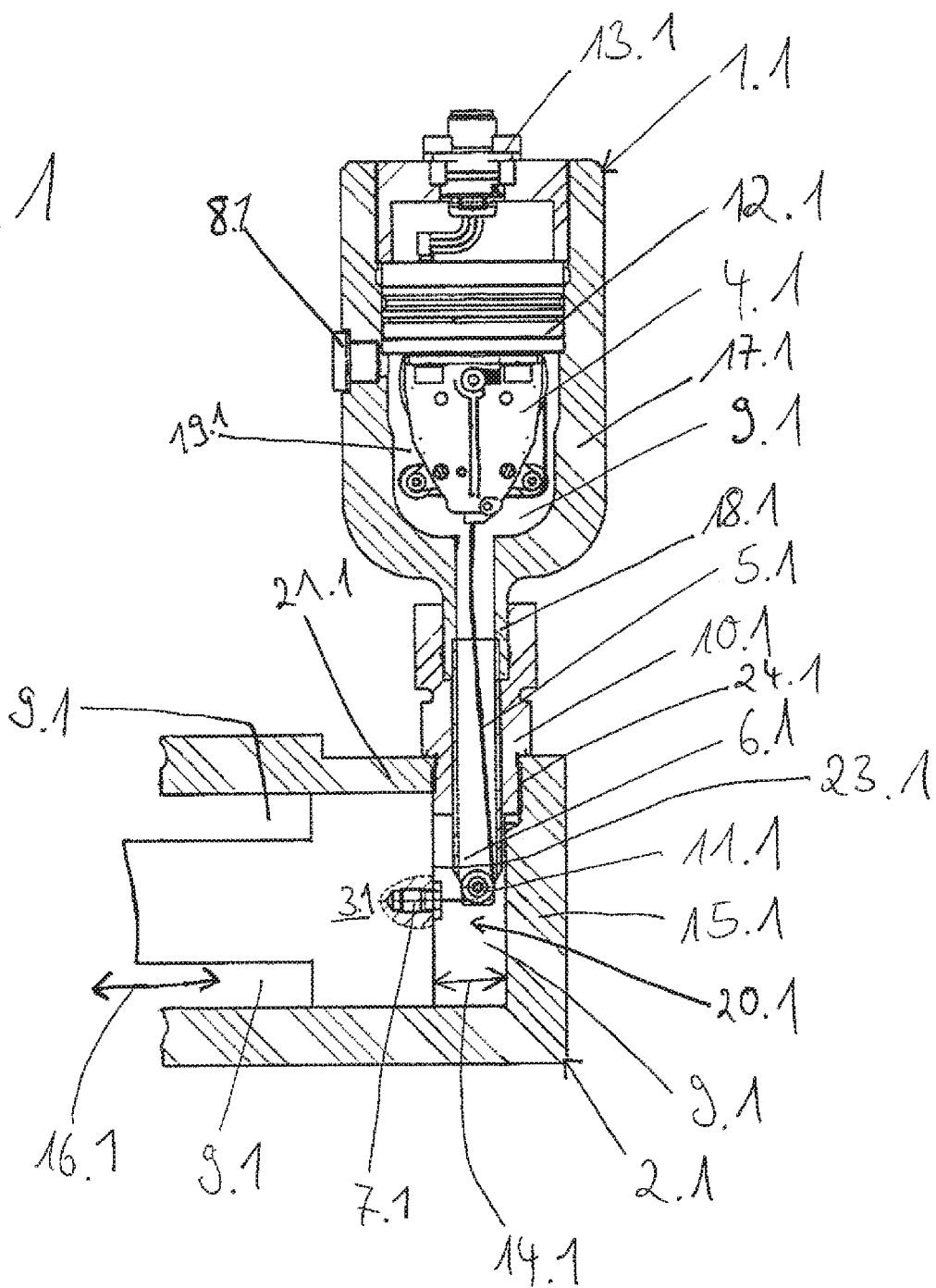

FIG. 1 shows an embodiment of a position sensor 1.1 according to the invention with a working cylinder 2.1. This position sensor 1.1 is shaped like a bottle or cartridge. The position sensor 1.1 is arranged laterally on a working cylinder 2.1 in the area of a cylinder head 15.1, whereby laterally means orthogonal to a piston stroke direction 16.1 of a piston 3.1 of the working cylinder 2.1. The position sensor 1.1 is connected to the working cylinder 2.1 by a flange connection 10.1, referred to hereinafter for the sake of simplicity as flange 10.1. Both an extending portion the flange 10.1 and a sensor arm 6.1 of the position sensor 1.1 pass through a working cylinder wall 21.1 of working cylinder 2.1. For this purpose a bore 24.1 in the working cylinder wall 21.1 is included.

Inside the position sensor 1.1, a cable drum 4.1 is arranged on a seal 12.1 in a pressure room 19.1 in the direction of a bottleneck area 18.1. This pressure room 19.1 is limited by the seal 12.1 in the direction of an interface 13.1, which is located on the side of the seal facing away from the working cylinder 2.1. On the other hand, in the direction of the bottleneck area 18.1 of the position sensor 1.1, the pressure room 19.1 forms a connection with a pressure chamber 20.1 of the working cylinder 2.1, when correctly installed, via a sensor arm 6.1. Due to this connection, pressure room 19.1 is filled with a fluid 9.1, which is also present in pressure chamber 20.1 of working cylinder 2.1. Thus the same pressure conditions prevail both in the pressure chamber 20.1 of working cylinder 2.1 and in pressure room 19.1 of position sensor 1.1.

The cable drum 4.1, which is arranged on the seal 12.1 in the direction of the bottleneck area 18.1 in the pressure room 19.1 of the position sensor 1.1, has an unwindable and rewindable cable 5.1. The cable 5.1 has a piston anchor 7.1 at its end facing away from the cable drum 4.1.

The piston anchor 7.1 is connected positively or non-positively to piston 3.1 when the position sensor 1.1 is correctly installed in working cylinder 2.1. The piston anchor 7.1 engages in the center of the upper side 23.1 of the piston 3.1. It is also provided that the piston anchor 7.1 can be screwed into the piston 3.1 in a central position, which is why the piston anchor 7.1 is equipped with a thread which can be screwed into a corresponding threaded hole in the piston 3.1. The upper side 23.1 of piston 3.1 means the side of the piston facing the cylinder head 15.1. Center means the center of this top face 23.1, whereby in the case of a circular piston 3.1, the distance from the center in any outward direction to the inside of the working cylinder wall 21.1 is the same.

The cable drum 4.1 is located in the pressure room 19.1 of the position sensor 1.1 at the seal 12.1. The seal 12.1 separates the pressurized area of the pressure room 19.1 of the position sensor 1.1 or the pressure chamber 20.1 of the working cylinder 2.1 from an external area with normal atmospheric pressure. This normal pressure area is located on the side of seal 12.1 facing away from the cable drum 4.1. The interface 13.1 is located on this side of the seal.

The interface 13.1 is located in this area facing away from the cable drum 4.1, where normal atmospheric pressure prevails. The interface 13.1 records and transmits measurement data which are first recorded by the cable drum 4.1 and then transmitted wirelessly and in particular by magnetic data transmission through the seal 12.1.

The seal 12.1 preferably consists of a non-magnetic flange and a radial high-pressure seal, so that wireless, in particular magnetic data transmission can take place from the cable drum 4.1 to the interface 13.1.

The sensor arm 6.1 of the position sensor 1.1 reaches into the pressure chamber 20.1 of the working cylinder 2.1 when correctly installed. The sensor arm 6.1 guides the cable 5.1, which is connected at one end with the cable drum 4.1 in the pressure room 19.1, where it is rolled up and unrolled, by 90 degrees via a deflection roller 11.1 at one end so that the cable 5.1 can be moved or rolled up and unrolled at the other end in the piston stroke direction 16.1 via the piston anchor 7.1 anchored in the piston 3.1.

The length of the sensor arm 6.1 is individually adapted to the respective gage of the working cylinder 2.1, i.e. to the diameter of the working cylinder 2.1 or the piston 3.1, so that it is guaranteed that the cable 5.1 is moved exactly in the piston stroke direction 16.1, whereby the piston anchor 7.1 is anchored in the piston 3.1 at a central position and from the side of the pressure chamber 20.1.

The position sensor 1.1 also has a venting device 8.1 on its outer wall 17.1. This venting device 8.1 passes through the outer wall 17.1 and provides a pressure-tight opening and closing to the pressure room 19.1 of the position sensor 1.1.

Of course, the working cylinder 1.1 has a usual compensation system for the fluids 9.1 on both sides of the piston 3.1, which can be located in the working cylinder wall 21.1, for example. However, this usual balancing system is not shown for the sake of clarity.

FIG. 2 shows a further exemplary embodiment of a position sensor 1.2 with a working cylinder 2.2. Elements not named here are described in the design example in FIG. 1.

A working cylinder 2.2 differs from working cylinder 2.1 only in diameter. A position sensor 1.2 represents a further inventive embodiment and differs from position sensor 1.1 in the following points, whereby unnamed position marks are to be assigned to the corresponding position marks in FIG. 1.

The position sensor 1.2 is also formed in the shape of a bottle or cartridge and is also arranged laterally on a working cylinder 2 in the area of a cylinder head 15.2, whereby laterally means orthogonal to a piston stroke direction 16.2 of a piston 3.2 of working cylinder 2.1.

The dimensions of the position sensor 1.2 are slightly changed compared to the position sensor 1.1. This is necessary because a cable drum 4.2 is enclosed by a corresponding seal 12.2 and the cable drum 4.2 is less long but wider in comparison to the cable drum 4.1. The cable drum 4.2 enables a longer cable 5.2 to be accommodated than in the cable drum 4.1 The cable drum 4.2 is therefore suitable for longer working cylinders than the cable drum 4.1 in FIG. 1. Length is the dimension between the interface 13.2 and flange 10.2, width is the dimension orthogonal to this between the outer wall 17.2. The length of the cable 5.2 which can be wound up and unwound in the cable drum 4.2 determines for which working cylinder size the position sensor 1.2 is suitable, since the travel path of a piston 3.2 in the direction of piston stroke 16.2 is of different length depending on working cylinder 2.2.

The position sensor 1.2 is operatively connected to the working cylinder 2.2 by a flange 10.2, whereby an extension 22 of the outer wall 17.2 engages the flange 10.2 in a bottleneck area 18.2.

Both the flange 10.2 and a sensor arm 6.2 of the position sensor 1.2 passes through a working cylinder wall 21.2 of the working cylinder 2.2 at a bore 24.2.

The position sensor 2.1 is shaped, compared with the version shown in FIG. 1, to accommodate the seal 12.2 and the cable drum 4.2. The cable drum 4.2 differs from the cable drum 4.1 in that the cable 5.2, which is longer than the cable 5.1 in FIG. 1, can be accommodated. For this purpose, the cable drum 4.2 is shaped in such a way that the cable 5.2 is wound up and unwound there orthogonally to the alignment of sensor arm 6.2.

Furthermore, the interface 13.2, which receives and transmits the measurement data from the cable drum 4.2 differs in its design, but without fulfilling a different function compared to interface 13.1.

With reference to FIGS. 1 and 2, the operation of the device of the invention is explained as follows:

The position sensor 1.1, 1.2 according to the invention is suitable for different, in particular also working cylinders of small bore, i.e. working cylinders with a small diameter, due to the lateral arrangement on the working cylinder 2.1, 2.2 orthogonal to the piston stroke direction 16.1, 16.2.

An adaptation of the position sensor 1.1, 1.2 to the respective gage of the working cylinder 2.1, 2.2 is effected by the sensor arm 6.1, 6.2, which in each case has exactly the length required to redirect the cable 5.1, 5.2 via the deflection roller 11.1, 11.2 by 90 degrees and thus exactly in the piston stroke direction 16.1, 16.2 to the center of the piston anchor 7.1, 7.2 anchored in the piston 3.1, 3.2. Gage means the inside diameter of the working cylinder 2.1, 2.2.

The travel path of the piston 3.1, 3.2 in the working cylinder 2.1, 2.2 in the direction of piston stroke 16.1, 16.2 is measured by the cable drum 4.1, 4.2 and cable 5.1, 5.2. This travel path is measured by the cable drum 4.1, 4.2 by unwinding and winding the cable 5.1, 5.2 from and onto it. The cable drum 4.1, 4.2, which is connected to the piston 3.1, 3.2 of the working cylinder 2.1, 2.2 via the cable 5.1, 5.2 and the piston anchor 7.1, 7.2, thereby detects the movement and the respective position of the piston 3.1, 3.2 in the working cylinder 2.1, 2.2 and then transmits this information, as well as other measurement data relating to the working cylinder, to the interface 13.1, 13.2.

These measurement data recorded in this way relating to the respective position and movement of the piston 3.1, 3.2 are then transmitted wirelessly, preferably by magnetic data transmission, from the cable drum 4.1, 4.2 through the seal 12.1, 12.2, which is preferably made of non-metallic material, to the interface 13.1, 13.2, which is located in the normal atmospheric pressure range of the position sensor 1.1, 1.2.

The interface 13.1, 13.2 acquires the information transmitted by the cable drum 4.1, 4.2 and forwards it to appropriate control, display and transmission systems not shown in FIGS. 1 and 2.

Although only two preferred embodiments of the invention have been described and presented, it is obvious that the skilled person can add numerous modifications without leaving the essence and scope of the invention. In particular, the length of the sensor arm 6.1, 6.2 and the design of the cable drum 4.1, 4.2 are variable. This means that the sensor arm 6.1, 6.2 can be replaced by another sensor arm whose length is adapted to the gage of the present working cylinder 2.1, 2.2. Furthermore, by adapting the cable drum 4.1, 4.2 and thus the length of the cable 5.1, 5.2, a flexible adaptation to the respective working cylinder is possible. The different designs of the cable drums and thus the length of the cables cover a measuring range in working cylinders or other corresponding cylinders from 0 to 5000 mm length or greater.

| Reference list | |
| --- | --- |
| 1 | position sensor |
| 2 | working cylinder |
| 3 | piston |
| 4 | cable drum |
| 5 | cable |
| 6 | sensor arm |
| 7 | piston anchor |
| 8 | venting device |
| 9 | fluid |
| 10 | flange |
| 11 | deflection roller |
| 12 | seal |
| 13 | interface |
| 14 | stroke loss |
| 15 | cylinder head |
| 16 | piston stroke direction |
| 17 | outer wall |
| 18 | bottleneck area |
| 19 | pressure room |
| 20 | pressure chamber |
| 21 | working cylinder wall |
| 22 | extension |
| 23 | upper side piston |
| 24 | bore |
| 25 | |
| 26 | |
| 27 | |
| 28 | |
| 29 | |
| 30 | |
| 31 | |

The invention claimed is:

1. A working cylinder having a position sensor (1.1, 1.2), the working cylinder (2.1, 2.2) having a piston (3.1, 3.2) and a cylinder head (15.1, 15.2), the position sensor comprising a cable drum (4.1, 4.2), a cable (5) wound onto the cable drum, a piston anchor (7.1, 7.2) for securing the cable (5) to the piston (3.1, 3.2), and an interface (13.1, 13.2), wherein position and movement of the piston (3.1, 3.2) are determined by movement of the cable (5) on the cable drum (4.1, 4.2) and transmitted to the interface, and wherein the position sensor further comprises a flange connection (10.1, 10.2) having a flange portion adjacent to an outer cylindrical surface of a sidewall of the cylinder head, and having an extending portion extending through the sidewall of the cylinder head, the cable (5) extending from the cable drum (4.1, 4.2) through the flange connection (10.1, 10.2) and around a deflection roller (11.1) to connect with the piston (3.1, 3.2) through the piston anchor (7.1, 7.2), and further comprising a sensor arm (6.1, 6.2) which extends through the flange connection (10.1, 10.2).

2. The working cylinder according to claim 1, wherein the position sensor (1.1, 1.2) extends from the working cylinder orthogonal to a piston stroke direction (16.1, 16.2).

3. The working cylinder according to claim 1, wherein the deflection roller (11) is mounted to the sensor arm (6.1, 6.2).

4. The working cylinder according to claim 1, wherein the cable drum (4.1, 4.2) is arranged in a pressure room (19.1, 19.2), wherein the pressure room (19) is connected to a pressure chamber (20.1, 20.2) of the working cylinder (2.1, 2.2) via a bottleneck area (18.1, 18.2), the sensor arm (6.1, 6.2) and the flange connection (10.1, 10.2).

5. The working cylinder according to claim 4, wherein the pressure room (19.1, 19.2) of the position sensor (1.1, 1.2) and the pressure chamber (20.1, 20.2) of the working cylinder (2.1, 2.2) are filled with fluid (9.1, 9.2), wherein the same pressure is prevailing in the pressure room (19.1, 19.2) and the pressure chamber (20.1, 20.2).

6. The working cylinder according to claim 4, further comprising a sealable opening in a sidewall of the pressure room (19.1, 19.2).

7. The working cylinder according to claim 1, wherein the cable drum (4.1, 4.2) detects measurement data on the position and movement of the piston (3.1, 3.2).

8. The working cylinder according to claim 1, wherein the cable drum (4.1, 4.2) transmits measurement data on the position and movement of the piston (3.1, 3.2) to the interface (13.1, 13.2).

9. The working cylinder according to claim 1, wherein the cable drum (4.1, 4.2) is interchangeable with cable drums of different sizes to adapt the sensor to working cylinders of different sizes.

10. The working cylinder according to claim 9, wherein the cable drums of different sizes comprise cables of different lengths wound on the cable drums of different sizes.

11. The working cylinder according to claim 10, wherein the cable drums of different sizes and/or the cables of different lengths allow a piston stroke measuring range of 0 to 5000 millimetres.

12. The working cylinder according to claim 1, wherein the flange connection (10.1, 10.2) is a screw connection.

13. A working cylinder having a position sensor (1.1, 1.2), the working cylinder (2.1, 2.2) having a piston (3.1, 3.2) and a cylinder head (15.1, 15.2), the position sensor comprising a cable drum (4.1, 4.2), a cable (5) wound onto the cable drum, a piston anchor (7.1, 7.2) for securing the cable (5) to the piston (3.1, 3.2), and an interface (13.1, 13.2), wherein position and movement of the piston (3.1, 3.2) are determined by movement of the cable (5) on the cable drum (4.1, 4.2) and transmitted to the interface, and wherein the position sensor further comprises a flange connection (10.1, 10.2) having a flange portion adjacent to an outer cylindrical surface of a sidewall of the cylinder head, and having an extending portion extending through the sidewall of the cylinder head, the cable (5) extending from the cable drum (4.1, 4.2) through the flange connection (10.1, 10.2) and around a deflection roller (11.1) to connect with the piston (3.1, 3.2) through the piston anchor (7.1, 7.2), wherein the cable drum (4.1, 4.2) transmits measurement data on the position and movement of the piston (3.1, 3.2) to the interface (13.1, 13.2), and wherein transmission of the measurement data of the cable drum (4.1, 4.2) to the interface (13.1, 13.2) is wireless.

14. The working cylinder according to claim 13, wherein the transmission of measurement data is by magnetic data transmission.

15. A working cylinder having a position sensor (1.1, 1.2), the working cylinder (2.1, 2.2) having a piston (3.1, 3.2) and a cylinder head (15.1, 15.2), the position sensor comprising a cable drum (4.1, 4.2), a cable (5) wound onto the cable drum, a piston anchor (7.1, 7.2) for securing the cable (5) to the piston (3.1, 3.2), and an interface (13.1, 13.2), wherein position and movement of the piston (3.1, 3.2) are determined by movement of the cable (5) on the cable drum (4.1, 4.2) and transmitted to the interface, and wherein the position sensor further comprises a flange connection (10.1, 10.2) having a flange portion adjacent to an outer cylindrical surface of a sidewall of the cylinder head, and having an extending portion extending through the sidewall of the cylinder head, the cable (5) extending from the cable drum (4.1, 4.2) through the flange connection (10.1, 10.2) and around a deflection roller (11.1) to connect with the piston (3.1, 3.2) through the piston anchor (7.1, 7.2), and further comprising a seal (12.1, 12.2) between the cable drum (4.1, 4.2) and the interface (13), wherein the seal comprises a non-magnetic flange and a radial high-pressure seal.

\* \* \* \* \*